Figures 1, 2:
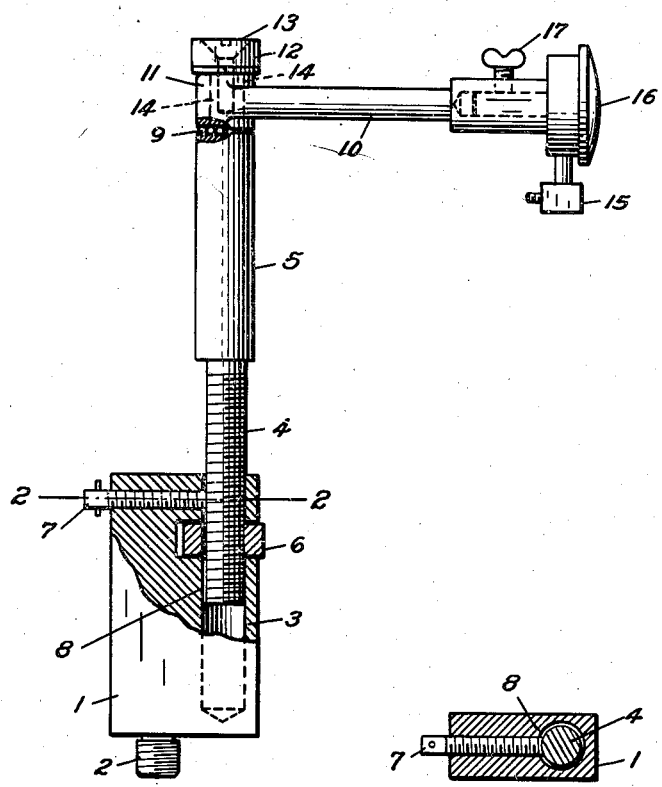

July 12, 1949.  H. E. DUNCAN  2,476,239
SUPPORT FOR INDICATOR GAUGES
Filed Feb. 24, 1945

INVENTOR.
H. E. DUNCAN
BY
Merrill M. Blackburn

Patented July 12, 1949

2,476,239

UNITED STATES PATENT OFFICE 2,476,239

SUPPORT FOR INDICATOR GAUGES

Harold E. Duncan, Bettendorf, Iowa

Application February 24, 1945, Serial No. 579,662

6 Claims. (Cl. 248—122)

My present invention relates to apparatus to be mounted upon a lathe carriage and used in the checking of the shape of turned objects such as shafts. Such apparatus is represented in the patented art by the patents to Scusa, No. 1,765,624 and No. 1,792,043.

Among the objects of this invention are to provide an apparatus of the type indicated which is simple and easily applied for use but still is more accurate in results than prior structures for the same use; to provide a structure for the purpose indicated which can be set to indicate a particular size of object, then turned to an inoperative position and then returned to operative position without any variation; to provide a tool of the type designated which is extremely accurate in its dimension indications notwithstanding movements of parts during use; and such further objects, advantages, and capabilities as will hereafter appear and as are inherent in the structure disclosed herein. My invention further resides in the combination, construction, and arrangement of parts illustrated in the attached drawings and, while I have shown therein what is now regarded as the preferred embodiment of this invention, I desire the same to be understood as illustrative only and not to be interpreted in a limiting sense.

In the drawings attached hereto and forming a part hereof,

Fig. 1 is an elevation, partly broken away, of a structure embodying my invention; and Fig. 2 shows a transverse section substantially along the plane indicated by the line 2—2, Fig. 1.

Reference will now be made in greater detail to the annexed drawings for a more complete description of this invention. The body 1 has at one end a screw-threaded plug 2 used for mounting this device upon a lathe carriage, provided with a screw-threaded opening for the reception of the plug 2. The body has a hole 3 for the reception of the screw-threaded end 4 of the supporting post 5, which is vertically adjustable by means of the milled nut 6 and may be secured in adjusted position by means of the set screw 7 bearing against the flattened face 8 of the post 5.

At its upper end the post 5 is provided with a ball race for the reception of the balls 9 of a ball-bearing. An arm 10 has, at one end, a head 11, provided on its underside with a race for the balls 9. A head or washer 12 is provided with a central opening for the reception of a screw 13. The upper end of the post 5 is reduced in diameter, as shown by the dotted lines at 14, for the reception of the head 11. It is possible, by tightening the screw 13, to make the head 11 fit the balls tightly enough so that there will be no wobbling of the head or the arm 10 carried thereby. In other words, the arm 10, when turned about the end of post 5, will describe a perfect circle, and the height of the gauge element 15 will not vary. Therefore, if the arm 10 is swung around and then brought back to working position, the pointer of gauge 16 will read the same as before. The gauge 16 can be adjusted forward and back by loosening the set screw 17 and then moving the gauge until the gauge contact element 15 rests upon the top of the shaft, when the screw will again be tightened.

Let us now assume that it is desired to use this device on a lathe for checking the form of a turned article, such as a shaft. The plug 2 is screwed into the hole provided therefor in the lathe carriage until the block is immovably positioned. Then the shaft 5 is raised or lowered until the arm 10 can be swung around to bring the contacting element 15 over the shaft to be checked. If it is necessary to move the gauge forward or back, this can be done by loosening the screw 17 and sliding the gauge until the contact element is directly above the article being checked. However, after the device has once been set, it will rarely, if ever, be necessary to make this adjustment. Now with the element 15 resting on or located directly above the shaft being checked, unless the gauge 16 reads zero, the screw 7 is loosened enough to permit sliding of shaft 5 and nut 6 is turned to raise or lower the shaft 5 until the gauge is brought to zero or such other initial point as is selected, the word "zero" being used in this instance to mean the initial point of comparison. When this inital point is reached, the screw 7 is tightened up to hold the shaft 5 against any movement. Then, when a piece of work has been finished and checked, the arm 10 is swung about the pivot indicated by the dotted lines 14 to get it out of the way for the removal of the finished work and the insertion of new work. When the arm 10 is swung again into checking position, it will occupy the same position as previously and the work can be turned down until the gauge reads "zero." The work will then be the same size as that previously done. In this way, any desired number of pieces of identical size can be produced without re-setting the gauge.

It will of course be understood that the specific description of structure set forth above may be departed from without departing from the spirit of this invention as set forth herein and in the appended claims.

Having now described my invention, I claim:

1. A device for the purpose stated comprising a block for support upon a lathe carriage, said block having a substantially cylindrical opening therein extending perpendicularly away from the carriage, a post fitting closely in said opening and rising above the block, screw-threaded means for holding said post in adjusted position in said opening, said block having means for holding said post against rotation in said opening, and a gauge-supporting arm pivotally mounted upon the upper end of said post to swing thereabout at a fixed distance from the block and adapted to support the work-contacting element of the gauge in position to contact an article being operated upon.

2. A structure for the purpose indicating comprising a post-supporting block adapted to be rigidly secured to a lathe carriage, said block having a post fitting closely in a hole in said block and rising substantially vertically therefrom, a gauge-supporting arm having a transverse opening therethrough, said post having its upper end portion reduced for close encirclement by the wall of said transverse opening, and means for holding the arm closely adjacent the shoulder formed by the reduction of the end portion of said post.

3. A gauge support for supporting on a lathe carriage a work-checking gauge, comprising a gauge-supporting arm adapted to have a gauge adjustably mounted at one end thereof, the opposite end of said arm having a head thereon, said head having a substantially cyclindrical opening extending transversely therethrough, a supporting post having an end portion thereof reduced to fit closely in said opening but having a turning fit therein, means holding said arm against play with relation to said post, and means for holding said post in definite position with relation to the lathe carriage by which it is carried.

4. In a structure for the purpose indicated, the combination of a block provided with means for attaching it rigidly to a lathe carriage, said block having an opening extending substantially therethrough, a post having one end screw-threaded for a substantial distance, said block having an opening extending into one side thereof transversely of the first mentioned opening and intersecting the same, the screw-threaded end of the post extending into said first mentioned opening, a nut located in the second mentioned opening and receiving the post, adjustably, said nut serving as adjusting means for vertically adjusting the post, and securing means for fastening the post against movement in the block.

5. A structure for the purpose indicated comprising, in combination, a post having one end reduced to provide a cyclindrical end portion surrounded at its inner end with a ball race for a ball bearing, a block for rigid connection to a lathe carriage, said block having an opening for reception of the end of the post, a supporting arm mounted on said cylindrical end portion to be swung horizontally thereabout, and a checking gauge carried by said arm.

6. A structure for the purpose indicated comprising, in combination, a post having one end reduced to provide a cyclindrical end portion surrounded at its inner end with a ball race for a ball bearing, the second end of the post being screw-threaded, a block for rigid connection to a lathe carriage, said block having an opening for reception of the threaded end of the post and having another opening extending into one side of the block and intersecting the first mentioned opening in the block, and a nut located in the second mentioned opening and having screw-threaded engagement with the threads of the post whereby the post may be adjusted vertically in the block, said post having a flat face on its screw-threaded portion to be engaged by a holding means whereby it may be held against turning in the block and held against longitudinal movement when such is not desired.

HAROLD E. DUNCAN.

REFERENCES CITED

The following references are of record in the file of this patent:

UNITED STATES PATENTS

| Number | Name | Date |
|---|---|---|
| 202,621 | Wood | Apr. 16, 1878 |
| 289,179 | Tregurtha | Nov. 27, 1883 |
| 539,031 | Born | May 14, 1895 |
| 743,270 | Golcher | Nov. 3, 1903 |
| 1,313,061 | Brown | Aug. 12, 1919 |
| 2,124,006 | Parker | July 19, 1938 |
| 2,258,175 | Coleman | Oct. 7, 1941 |
| 2,287,890 | Legassey | June 30, 1942 |